Nov. 25, 1924.

E. R. VIBERG ET AL 1,517,182

TRUCK CONSTRUCTION

Filed Aug. 4, 1923

INVENTORS
ERNEST. R. VIBERG
ERIC. ELGGREN
BY Fetherstonhaugh & Co
ATTORNEYS

Patented Nov. 25, 1924.

1,517,182

UNITED STATES PATENT OFFICE.

ERNEST R. VIBERG AND ERIC ELGGREN, OF MONTREAL, QUEBEC, CANADA.

TRUCK CONSTRUCTION.

Application filed August 4, 1923. Serial No. 655,656.

*To all whom it may concern:*

Be it known that we, ERNEST R. VIBERG, a subject of the King of Great Britain, and ERIC ELGGREN, a subject of the King of Sweden, both residents of the city of Montreal, Quebec, Canada, have invented certain new and useful Improvements in Truck Constructions, of which the following is a full, clear, and exact description.

This invention relates to new and useful improvements in truck construction for railways, tramways, or the like, and the object of the invention is to provide a simple, inexpensive and efficient shock absorbing connection between the bolster and the transoms of a truck.

Another object is to provide a device which will prevent the bolster from changing its position too rapidly in the vertical and lateral directions.

A further object is to provide a device which will prevent the bolster from fouling the transom due to any sudden loadings.

In our invention we provide tying links between the transom and the bolster, said links having ball socket connections which offer very little resistance to movement in the horizontal and vertical directions. The links are so designed as to prevent the transom and the bolster from coming in contact, thereby eliminating the use of friction plates which are usually fitted between the transoms and the bolster. The ball socket connections, owing to their construction, offer sufficient friction to soften any movement between the transom and the bolster. The ball socket bearings are provided with removable caps and springs are placed within said caps to provide a cushioned connection for the links.

Figure 1:
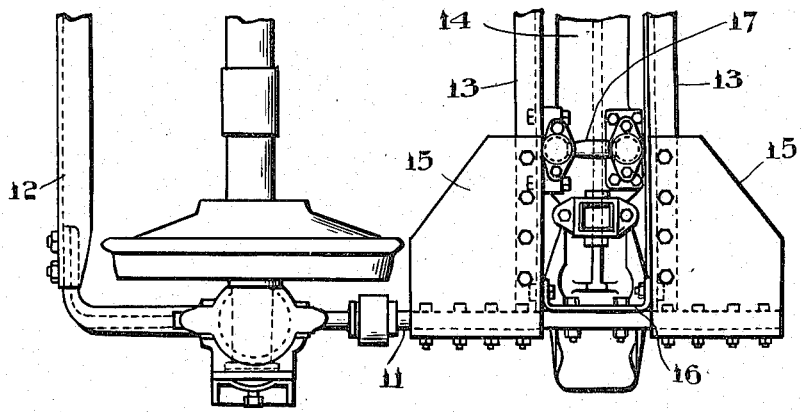
Figure 1 is a partial plan of a truck showing the connection between the transom and the bolster.
Figure 2:
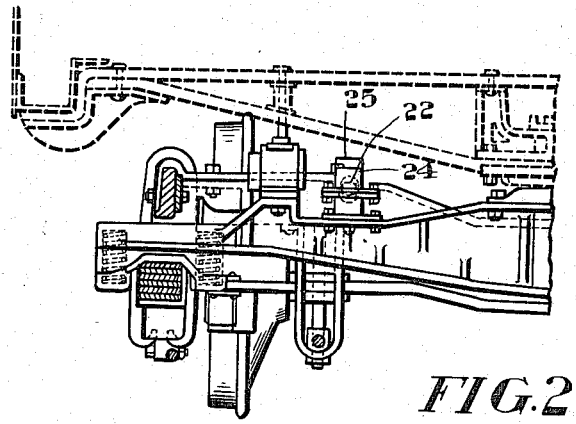
Figure 2 is a partial end elevation of the truck.
Figure 3:
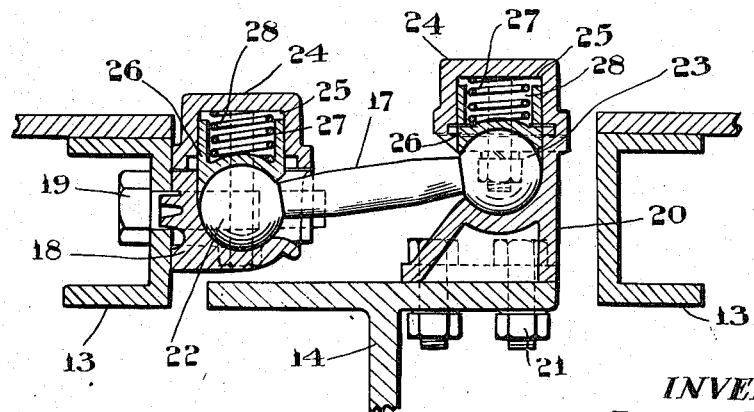
Figure 3 is a sectional elevation showing the construction of the link connection.

Referring more particularly to the drawings, 11 designates a side frame of any suitable construction. The side frames are connected at their ends by the tying members 12 and at the centre by the spaced transoms 13, between which the truck bolster floats. The transoms are preferably structural shapes, such as channels, and are located with their upper faces a short distance below the top line of the side frames. Large gusset plates 15 are securely fixed to the transoms and the side frames to prevent any cross winding or binding of the truck. The transoms are additionally connected to one another and to the side frames by the brackets 16. Between the bolster and the transom, links 17 are fitted which fit into ball socket brackets 18, bolted to the transom by means of the bolts 19, and the ball socket bearing 20 bolted to the bolster by means of the bolts 21, the ball ends 22 and 23 of the links fitting into the bearings 18 and 20 respectively. These links are fitted to the truck and are spaced equidistant from the centre one on each side of the centre line. The brackets may be split and fitted with caps 24 having a recess 25 adapted to receive the top half 26 of the socket bearing as shown in Figure 3. To provide a cushioning device between the cap and the top half of the bearing a compression spring 27 is fitted, the bearing having a recess 28 adapted to receive the spring which is held in position by the cap. The bearing does not extend to the top of the cap and, therefore, allows slight movement of the bearing in the vertical direction. These bearings may be of any suitable design without departing from the spirit of the invention.

The operation of the device is as follows: When any excessive binding or shock loading occurs due to starting or stopping, or other such reason, the shock is transmitted through the link from the bolster to the transoms or vice-versa. The links being of the ball socket type allow the bolster to adjust itself in the vertical and lateral directions, but prevent the bolster and the transoms from coming in contact. The springs in the caps allow the links to move smoothly and evenly and assist in absorbing any shocks due to sudden loadings. The links also prevent the bolster from coming in contact with the transom, and also allow the bolster to float to suit all conditions of loading.

Having thus described our invention, what we claim is:—

1. In a device of the character described, side frames, spaced transoms securely fastened to the side frames, a bolster suitably supported and adapted to float between the said transoms, ball socket brackets attached to one of said transoms, ball socket brackets securely fixed to the bolster, and links connecting the transom ball socket brackets to the bolster ball socket brackets.

2. In truck construction, side frames, spaced transoms securely attached to the side frames and to each other, a bolster suitably supported and adapted to float between said transoms, ball socket brackets attached to one of said transoms, ball socket brackets attached to the bolster, ball ended links connecting the transom brackets to the bolster brackets, caps on said brackets and cushioning means between the links and the caps to soften the movement of the bolster.

3. In truck construction, side frames, spaced transoms securely attached to the side frames and to each other, a bolster suitably mounted and adapted to float between said transoms, ball socket brackets securely attached to one of said transoms, ball socket brackets securely attached to the bolster, caps for said bearings, a sliding half-spherical bearing slidably mounted in said caps, ball ended links connecting the bolster brackets with the transom brackets, and springs between the caps and sliding half-spherical bearing to soften the movement of the links.

In witness whereof, we have hereunto set our hands.

ERNEST R. VIBERG.
ERIC ELGGREN.